(12) United States Patent
Porcari et al.

(10) Patent No.: US 8,429,723 B2
(45) Date of Patent: Apr. 23, 2013

(54) METHOD AND SYSTEM FOR ROLE-BASED ACCESS CONTROL TO A COLLABORATIVE ONLINE LEGAL WORKFLOW TOOL

(76) Inventors: Damian O. Porcari, Farmington Hills, MI (US); David Dinsdale, London (GB)

( * ) Notice: Subject to any disclaimer, the term of this patent is extended or adjusted under 35 U.S.C. 154(b) by 0 days.

(21) Appl. No.: 13/166,040

(22) Filed: Jun. 22, 2011

(65) Prior Publication Data

US 2011/0252333 A1      Oct. 13, 2011

Related U.S. Application Data

(63) Continuation of application No. 10/441,941, filed on May 20, 2003, now abandoned.

(60) Provisional application No. 60/381,841, filed on May 20, 2002.

(51) Int. Cl.
*H04L 29/00*      (2006.01)

(52) U.S. Cl.
USPC .................................... 726/4; 726/3; 726/28

(58) Field of Classification Search .................. None
See application file for complete search history.

(56) References Cited

U.S. PATENT DOCUMENTS

| | | | |
|---|---|---|---|
| 2002/0161733 A1* | 10/2002 | Grainger | 706/45 |
| 2007/0168871 A1* | 7/2007 | Jenkins | 715/751 |
| 2007/0208669 A1* | 9/2007 | Rivette et al. | 705/59 |

OTHER PUBLICATIONS

Barka et al., Framework for Role-Based Delegation Models, IEEE, 2000.*

* cited by examiner

*Primary Examiner* — Minh Dinh

(74) *Attorney, Agent, or Firm* — Brooks Kushman P.C.

(57) ABSTRACT

A computer system and method for distributed legal workflow security provides role-based access control to a collaborative online workflow tool. The system includes a computer network having one or more computers operably programmed and configured to receive input defining computer system access privileges for a plurality of distributed legal workflow participants. The system receives input associating one or more legal workflow role types defined by users with one or more of the distributed legal workflow participants to define the role-based access. Permission privileges are input and associated with a plurality of legal workflow graphical interface functions based on the one or more legal workflow role types. Based on the permission privileges associated with the role type of the participant, the system provides legal workflow graphical interface functionality to the one or more distributed legal workflow participants.

19 Claims, 17 Drawing Sheets

| Maintain Users - Step 1 of 3 - Search for users | | | | | |
|---|---|---|---|---|---|
| First Name | | | | | |
| Surname | | | | | |
| email address | | | | | |
| User Class | | | | | |
| If the current user is an Anaqua Customer User | | | | | |
| Organisation | | | | | pick list |

Tips for Searching

You can use the % character as a wild card. e.g. if you type smi% in the surname field, it will return all users with surname beginning with smi in your organisation.

Search   cancel

Maintain Users - Step 2 of 3 - Selecte the user to modify

| Surname, First Name | User Role | Tel No | User Class | Department | |
|---|---|---|---|---|---|
| Dinsdale, David | Anaqua User | 020 7845 1061 | Inventor | Dep A | View |
| Porcari, Damian | Anaqua Patent User | 313 390 1234 | Attorney | Dep B | View |

Page Name: \users\ModifyUserStep1and2.asp

— 48 (arrow to top of form)
52 (arrow to table area)

METHOD AND SYSTEM FOR ROLE-BASED ACCESS CONTROL TO A COLLABORATIVE ONLINE LEGAL WORKFLOW TOOL

CROSS-REFERENCE TO RELATED APPLICATIONS

This application is a continuation of application Ser. No. 10/441,941, filed May 20, 2003, which claims the benefit of U.S. Provisional Application No. 60/381,841, filed May 20, 2002, the contents of each of which are hereby incorporated by reference in their entirety.

BACKGROUND OF THE INVENTION

1. Field of the Invention

This invention relates to a collaborative online legal workflow tool and more particularly, to a method and system for role-based access control to a collaborative online legal workflow tool.

2. Background Art

A variety of legal workflow tools are currently available in the marketplace which allow users to manage an intellectual property portfolio. Typical information managed by these systems include filing and prosecution information for patent and trademark applications filed around the world. Many of these systems are based upon well known client-server architecture and provide limited ability for internal users to collaborate with external service providers without complex hardware and networking architecture.

Recently, developers have modified existing client-server systems to incorporate online collaborative tools, such as web access plugins, to allow a variety of users in various locations to access common information stored in the tool. One of the challenges associated with this collaborative exchange of information is the level of access and control users have to the information stored in the tool.

In today's legal arena, corporations, institutions and firm clients typically rely on multiple distributed firms and agencies to assist with or independently conduct their legal workflow. It is not uncommon for a single corporation to have several private law firms handling hundreds of co-pending legal matters ranging from basic transactional work to larger projects such as litigation, negotiation, etc. In the intellectual property area, for example, a corporation often relies on outside counsel to independently manage all searches and applications for trademarks, patents etc.

For example, a corporate attorney may provide access to one or more external service providers to records stored in the corporate workflow tool for which the external service provider is responsible for managing on a day to day basis. Current portfolio management solutions have security tools which restrict the external service provider's access only to records assigned to the external service provider. The external service provider is unable to access information entered by other service providers which may be related to the matters handled by that individual. This inability to collaborate with other service providers limits the level of service provided to the client and may create additional support burdens for both the corporation and the service provider.

A variety of companies currently offer software applications for managing or otherwise automating workflow in both the legal and non-legal arenas. One example is Aspen Grove's ipWorkflow. Aspen Grove is located at 101 Federal Street, Suite 1900, Boston, Mass. 02110 (www.aspengrove.net). Another example is offered by Vinsoft Solutions located at 1155 West Chestnut Street, Suite 2-C, Union, N.J. 07083 (www.vinsoftsolutions.com). Another example is offered by FoundationIP located at 830 TCF Tower, 121 South 8th Street, Minneapolis, Minn. 55402 (www.foundationip.com). Another example is Inproma offered by Computer Patent Annuities North America LLC located at 225 Reinekers Lane, Suite 400, Alexandria, Va. 22314 (www.cpajersey.com). Another example is offered by iManage located at 950 Tower Lane, Suite 500, Foster City, Calif. 94404 (www.imanage.com).

Embodiments and features of the present invention include an alternative to or valuable improvement upon conventional legal workflow applications. Without limiting the scope or applicability of the present invention, one goal of the present invention is to provide a collaborative online legal workflow tool which overcomes the limitations described above. It would also be advantageous to provide a method and system for role-based access control to information in the collaborative online legal workflow tool which provides central administration of legal workflow conducted by a plurality of distributed workflow participants.

SUMMARY OF THE INVENTION

Accordingly, a computer system and method for distributed legal workflow security is disclosed allowing role-based access control to a collaborative online workflow tool. The computer system provides central administration of legal workflow conducted by a plurality of distributed workflow participants. The system includes a computer network having one or more computers operably programmed and configured to receive input defining computer system access privileges for a plurality of distributed legal workflow participants.

The system receives input associating one or more legal workflow role types defined by users with one or more of the distributed legal workflow participants to define the role-based access. Permission privileges are input and associated with a plurality of legal workflow graphical interface functions based on the one or more legal workflow role types. Based on the permission privileges associated with the role type of the participant, the system provides legal workflow graphical interface functionality to the one or more distributed legal workflow participants.

Advantages of the present invention include a reduction in the time, cost and risk associated with conventional distributed/remote management of legal workflow. Via the online collaboration tool, integrated parties cooperate with real-time knowledge access and visibility to work product and status. By applying business/legal logic to this integrated pool of knowledge, a value-added workflow results.

BRIEF DESCRIPTION OF THE DRAWINGS

FIG. 7 is an example of a graphical user interface for displaying user search criteria;

FIG. 8 is an example of a graphical user interface for amending user details;

FIG. 14 is an example of a graphical user interface for displaying terms and conditions of user login;

FIG. 15 is an example of a graphical user interface for changing password features for user login;

FIG. 18 is an example of a graphical user interface for defining attributes of the user interface;

FIG. 20 is an example of a graphical user interface for maintaining legal workflow details;

FIG. 21 is an example of a graphical user interface for trademark application legal workflow details;

FIG. 22 is an example of a graphical user interface for conflict legal workflow details;

FIG. 23 is an example of a graphical user interface for defining organizational details; and FIG. 24 is an example of a graphical user interface for defining contact information.

DETAILED DESCRIPTION OF THE PREFERRED EMBODIMENT(S)

System Overview

Embodiments of the present invention relate to an online legal workflow collaboration tool and methodology. In today's legal arena, corporations, institutions and firm clients typically rely on multiple distributed firms and agencies to assist with or independently conduct their legal workflow. It is not uncommon for a single corporation to have several private law firms handling hundreds of co-pending legal matters ranging from basic transactional work to larger projects such as litigation, negotiation, etc. In the intellectual property area, for example, a corporation often relies on outside counsel to independently manage all searches and applications for trademarks, patents etc.

Advantages of such an online legal workflow collaboration tool and methodology include a reduction in the time, cost and risk associated with conventional distributed/remote management of legal workflow. Via the online collaboration tool, integrated parties cooperate with real-time knowledge access and visibility to work product and status. A law engine implements or otherwise applies business/legal logic to this integrated pool of knowledge to produce a value-added workflow.

Figure 1:
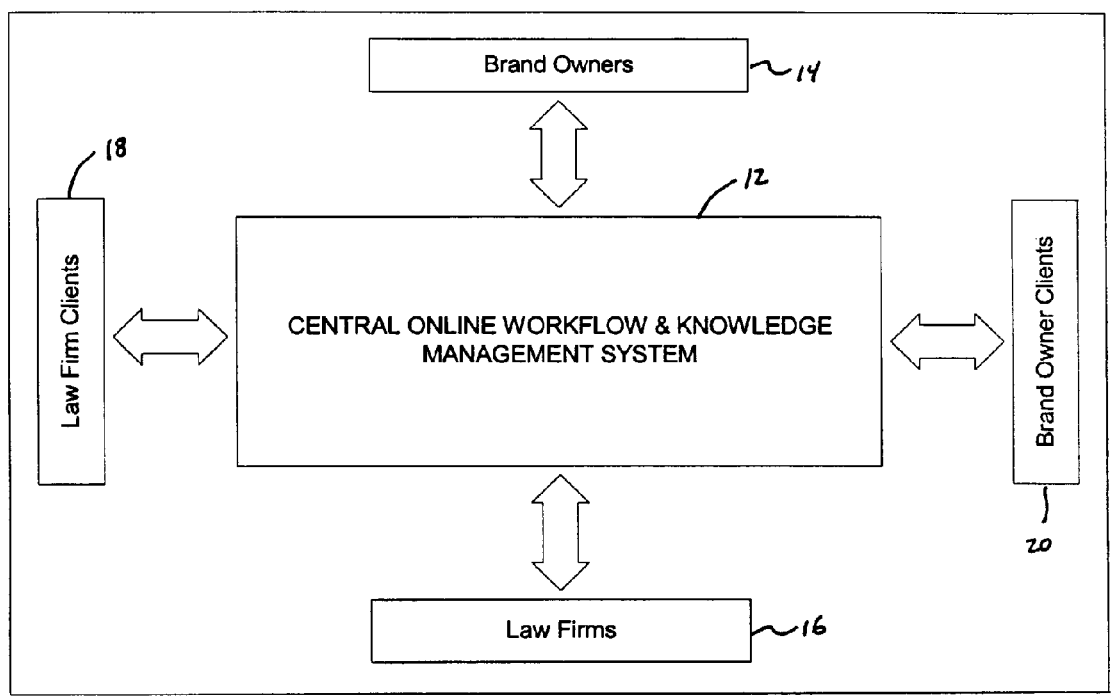
FIGS. 1 and 2 illustrate online legal workflow collaboration between organizations (e.g., brand owners, law firms, law firm clients, brand owner clients, etc.), business processes and information systems in accordance with one embodiment or aspect of the present invention.
Figure 2:
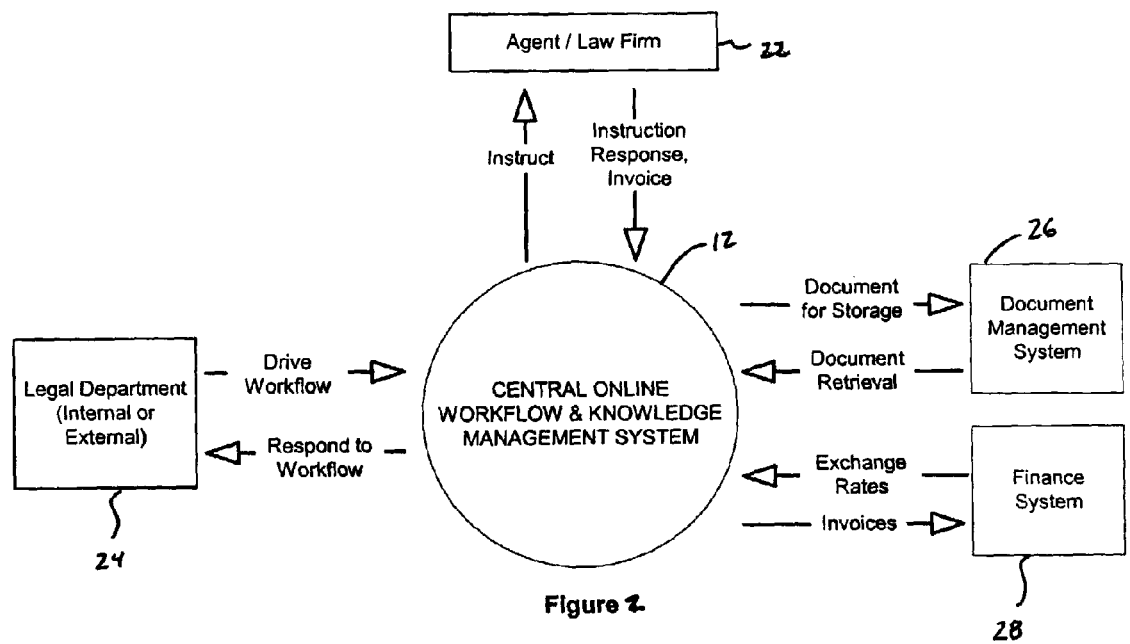

FIG. 1 illustrates an overview of environment 10 in which embodiments of the present invention may operate. A central online leal workflow and knowledge management system 12 operably interfaces or is otherwise in operable communication with a plurality of local or distributed workflow participants (e.g., brand owners 14, agents/law firms 16, law firm clients 18, brand owner clients 20, etc.). More specifically, and as illustrated in greater detail in FIG. 2, workflow participants (e.g. agent/law firm 22, legal department 24, etc.) and associated workflow applications (e.g. document management system 26, finance system 28, etc.) productively collaborate with one another via central online leal workflow and knowledge management system 12. Notably, an unlimited number of participants may collaborate with one another in an unlimited number of different fashions.

One aspect of the present invention is a system and methodology for controlling user access to the online legal workflow collaboration tool, or portions thereof. The system comprises a computer network including one or more computers operably programmed and configured to allow access to the collaborative online workflow tool. This aspect is easy to manage and a flexible user permissioning model that relies on the definition of generic roles for multiple users.

As evidenced by the variety and breadth of existing computer architectures hosting or otherwise supporting knowledge and management workflow applications, those of ordinary skill in the art recognize that such applications may be implemented on or over a multitude of different computing platforms and networks. According to one embodiment, functional aspects of the present invention may be centrally hosted from one or more web servers to web browsers located at a plurality of local or distributed workflow participant locations. Alternately, aspects of the present invention may be implemented according to a more dedicated/localized client-server architecture over a local or wide area network.

Example role types include a Customer User, an External Counsel (or agent) User, a Customer Client User, a Customer Client User with an anonymous log in, and an Inventor with an anonymous log in. In one embodiment, a Customer is a company who is using the system to store and manage their IP data. Preferably, where a Customer has subcontracted part of their service provision to an agent, the agent's users will still be Customer Users as they are essentially fulfilling the role of a Customer User.

In addition to a user ID/password, access to the system may be restricted at levels such as Menu level (e.g. create trademark—main screen, create trademark—based on etc.), and section of a page level (e.g. proprietor details on trademark not visible to External Counsel). While section of a page may be regarded at it's largest as a whole page, at it's smallest as a single data field or button, or somewhere between. The business users define the permissionable sections for each page.

A pragmatic approach may be taken as to whether it is best to create a complex permissioning scenario for a particular screen, or just create two or more screens. For example, for Trademarks, it may be simple to develop separate Trademark pages for Customer Users and External Counsel Users, than to create a complex permissioning model for a simple page.

External Counsel Users and Customer Client Users have the ability to see only the records for which their company has responsibility. A protocol may be followed that allows a user to view (read only) the diary of any other user from the same External Counsel organization and they may re-allocate tasks to other users in their organization.

Security Principles

The present invention assumes that people will attempt to hack the computer system or access areas outside their granted level of permission. To prevent this, security principles may be applied. For example, content for which a user is not permissioned may not be returned to the user from the server.

In another example, all permissionable actions (menus, pages, buttons, hyperlinks, etc.) will check (server side) before executing business logic that the user has permission to execute the action. This functionality will prevent hackers from guessing action calls, etc. Where appropriate, if the system detects any possible security issue, an e-mail may be sent to a system administrator. The activity may also be logged for further investigation.

User Trust Requirements

User Trust Requirements relate to the business process necessary to ensure that the person who is being added to the system has been verified as a valid user of the system for the permissions granted to them. The general principle is that a user with the appropriate permissions may create other users of their own user type (e.g., Customer User, External Counsel User or Customer Client User, etc.).

External Counsel may have the ability to create and maintain their own users. In one embodiment, they will not have the ability to modify the definitions of the roles for which they are permissioned. A Creating User is defined as a user who is logged in and who is creating a new user.

User Types

In accordance with a preferred embodiment of the present invention different access rights are provided for different types of users. Table 1 contains example user types in accordance with the present invention. It is envisioned that an unlimited number of user types may be defined.

TABLE 1

| | |
|---|---|
| User Type 1 | Customer User |
| User Type 2 | External Counsel (or agent) User |
| User Type 3 | Customer Client User |
| User Type 4 | Customer Client User - self-created log in |
| User Type 5 | Inventor - self-created log in |

The Customer User will generally be an employee. Examples include a Counsel/Attorney/Paralegal or other administrative staff. Some companies may have outsourced aspects of the management of their IP or other legal work to External Counsel; hence it is possible that a Customer User is from an External Counsel.

External Counsel are those companies instructed to do something by the Customer User in relation to the registration, renewal, maintenance, etc. of one or more of the Customer's records. As a general principle, External Counsel should only be able to access records that are allocated to the company to whom the user belongs.

The Customer Client User represents the client of the Customer. This could be an employee of an operating company. Customer Client Users are generally interested in a subset of records that relate to their company only.

Prior to display, each page checks that the user has the necessary authority to access the main record being displayed. If the record belongs to the Customer Client to whom the user also belongs, the record should be displayed. The Client field on the main record identifies the Customer Client User.

Permission Based on Model

Once an agent or client has been added to a particular record, a permission database is updated to reflect this automatically. Preferably, a user can add and remove rights to any particular record.

Menu Permissions

In a preferred embodiment of the present invention, a common menu is provided on each screen. The content of this menu will be specific to a role profile. Main Menu items not permissioned for a particular role are preferably de-activated, hidden, or greyed out. The Add Users and Maintain Roles permissions are maintained at the user level (on the user table).

Even if a role allocated to a user has been permissioned to add new users/maintain roles, the user setting will override this setting if there is a conflict. I.e., if the role allows access to the Add User capability, but the user account is flagged with the setting 'Add New User'=No, the user will be prevented from accessing this capability.

By default, if there is not a specific grant of permission for a menu item against a role, the permission to access that menu item is assumed to be no. A check on each page will also check if the user's account suspended, flag is set to yes. If they are, the user should be shown the account suspended page and logged off the system. Suspended accounts will not be allowed to log onto the system.

Sections of a Web Page Permissions

Preferably, each web page sections. These sections may contain one or more data fields and/or buttons etc. The sections for a particular screen are defined in the Workflow Specification for that screen. As each page is processed, the permissions for each section are applied.

Table 2 contains example permissions in accordance with one embodiment of the present invention.

TABLE 2

| | |
|---|---|
| No View/ Execute | No View applies to data (text boxes/list boxes, etc.) and sections. No Execute applies to buttons, links, etc. These two permissions have been grouped together as they are effectively the same, i.e., if a No View/Execute permission applies to a section of a web page, then the content of that section shall not be returned to the client at all Where the section includes executable items (buttons, links, etc.) the system must ensure at the server that these items are not executable (e.g., where a hacker guesses an action from a button on a page). |
| No Update | Applies to data. If the permission 'No Update' is flagged for a particular section, the data must not be allowed to be updated by the system. The system must both disable the user's ability to change the data on the page, and protect from a hacker calling a HTTP get/post action with modified data. |
| No Restrictions | The section of the page is fully permissioned. |
| Add | The ability to add a record is controlled at either the menu level (2.1.1 above), page level (2.1.2 above) or, if there is an add button on a page, via a No Execute permission on the button. |
| Delete | The ability to delete a record is controlled at page level (2.1.2 above) or via a No Execute permission on the Delete button on pages. |
| Grant | The ability to grant permissions is controlled by the User Trust Architecture - see below. |

Permissions may be applied in an optimistic way. E.g., the user is allowed the maximum possible access (all permissions granted) unless a permission exists to restrict access.

Vertical Data Filtering

To prevent users from seeing data that they are not authorized/required to see, the present invention may filter data for difference user categories such as those contained in Table 3.

TABLE 3

| Type of user | Filter required |
|---|---|
| Customer User | None |
| External Counsel (or agent User) | The ability to see only records allocated to that external counsel. |
| Customer Client User | The ability to see only records where the Customer Client is the proprietor. |

Additional user types may be added to the system requiring some kind of vertical data filtering (e.g., inventors, patent committee members, etc.).

Vertical Data Filtering—External Counsel (or Agent) User

Prior to display, each page may check that the user has the necessary authority to access the main IP record being displayed. If the record belongs to the External Counsel to whom the user also belongs, the record should be displayed. If the record does not belong to External Counsel to whom the user belongs, the user will be directed to an error page.

In some circumstances, an External Counsel may access to other records related to their own (e.g., based on, basis for, priority, etc.). External Counsel may subcontract a piece of work to another External Counsel.

Vertical Data Filtering—Customer Client User

Prior to display, each page may check that the user has the necessary authority to access the main IP record being displayed. If record belongs to the Customer Client to whom the user also belongs, the record should be displayed. If the record does not belong to the Customer Client to whom the user belongs, the user will be directed to an error page. Certain users may update certain records in a particular territory.

How Changes to Permissions and Roles are Implemented

Changes to the definition of a role may actioned the next time a user logs in (for permissions held at server or session level) or the next time a user tries to access a capability (for permissions that are dynamically derived from the database).

Figures 3, 4:
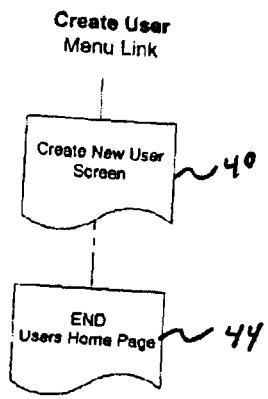
FIG. 3 is a flowchart illustrating a workflow for adding a new user to the system.
FIG. 4 is an example of a graphical user interface for adding a new user to the system.

FIG. 3 is a preferred workflow diagram for adding a new user. At step 40, information about the new user is entered into the user create screen illustrated as FIG. 4. A prerequisite to this process may require that the creating user AND creating user's role have been flagged as having the ability to add new users. Preferably, any role may be allocated to the new user with the exception that only System Technical Support users may add other System Technical Support users.

FIG. 4 is an example user interface for adding a new user. The graphical user interface is generally illustrated as reference numeral 42. Table 4 defines example attributes for the different aspects of the user interface illustrated in FIG. 4.

TABLE 4

| Label | Table/Field | Mandatory | Type | Details and validation |
|---|---|---|---|---|
| All fields are from the User table unless otherwise specified | | | | |
| Salutation | Salutation | Optional | Text | |
| First Name | FirstName | Mandatory | Text | |
| Surname | Surname | Mandatory | Text | |
| Job Title | JobTitle | Mandatory | Text | |
| Tel No | TelephoneNo | Mandatory | Text | |
| Fax No | FaxNo | Optional | Text | |
| Mobile Tel No | MobileNo | Optional | Text | |
| Role Profile | UserRoleID | Mandatory | Dropdown | Default is creating users role profile Dropdown list from role profile table defaulting to creating users role profile. If the user is an External Counsel User, they should only see roles flagged as available to External Counsel. |
| User Class | UserClassID | Mandatory | Dropdown | No Default. Dropdown list from User Class table ((Mandatory) (Attorney, Inventor, Searcher, etc.). This field is used to help searching. |
| Welcome Message | None | Optional | Text | A message to the user that will be sent in the welcome e-mail. |

TABLE 4-continued

| Label | Table/Field | Mandatory | Type | Details and validation |
|---|---|---|---|---|
| *If the creating user has role System Technical Support, the following fields may be displayed:* | | | | |
| User Type | UserTypeID | Mandatory | Dropdown | Defaults to Customer User'. Pick list of Customer User', 'External Counsel User', 'Customer Client User' |
| Organization | OrganisationID | Mandatory | Picklist | No default. If User Type = 'External Counsel', the creating user is required to enter the External Counsel Company from a pick list. If User Type = 'Customer Client', the creating user is required to enter the Customer Client Company from a pick list |
| *If the user being created is a Customer User* | | | | |
| Users Department/Team | DepartmentID | Optional | Dropdown | No default. Only for Customer Users. |

In one embodiment of the present invention, the "Create User" button creates the user according to the following process:

Action 1—Validate that the e-mail is not already in use. If it is, the Add New Users page is re-displayed (data preserved) with an error message.

Action 2—Generate an initial password for the user.

Action 3—Create the user on the system with the allocated role profile and password.

If the creating user has role System Technical Support, the new user will have user type as defined by the User Type field, with the Organization being set to the organization entered from the Organization pock list.

If the creating user is a Customer User, the new user will also be a Customer User and belong to the Customer organization.

If the creating user is an External Counsel, the new user will be an External Counsel User and belong to the same External Counsel organization as the creating user.

If the creating user is a Customer Client, the new user will be a Customer Client User and belong to the same Customer Client organization as the creating user.

Example default values for user fields are listed in Table 5.

TABLE 5

| Label | Table/Field | Mandatory | Type | Details and validation |
|---|---|---|---|---|
| None | LockedOut | Mandatory | | Default set to No |
| None | BadPWDAttempts | Mandatory | | Default set to 0 |
| None | T&CVersionSigned | Mandatory | | Default set to 0 |
| None | T&CNameTyped | Mandatory | | Default set to null |
| None | ChangePWDNextLogin | Mandatory | | Default set to Yes |
| None | LastLoginDate | Mandatory | | Default set to null |
| None | UserCanAddUsers | Mandatory | | Default set to No |
| None | UserCanAddRoles | Mandatory | | Default set to No |

Action 4—e-mail—E-mail to the user with the e-mail text set forth below in Table 6.

TABLE 6

E-mail Specification WSD011-001

| | |
|---|---|
| To: | New User E-mail |
| From: | <Helpdesk e-mail> |
| Cc: | None |
| Bcc: | None |
| Title: | Welcome to the <Customer Name> System |
| Details: | I am pleased to notify you of your login details for the <Customer Name> System<br>Password: <Password><br>You can access the system at the following URL<br><System URL><br><Message to the user> |
| Attachments: | None |

At step 44, the create user process is completed and the user returned to the user home page.

Figures 5, 6:
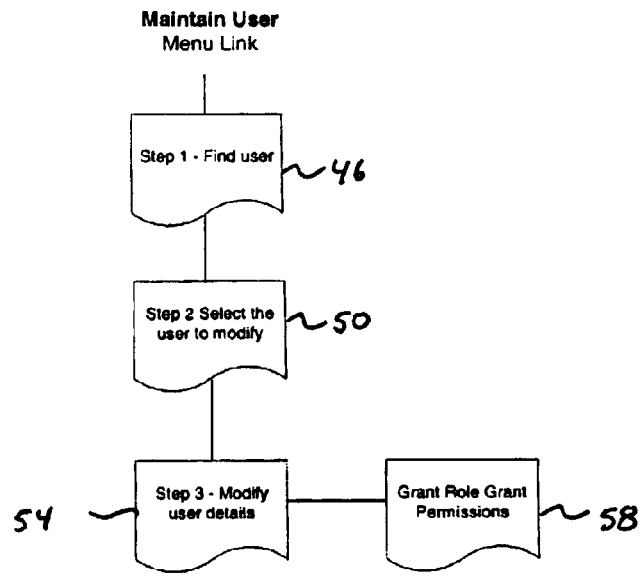
FIG. 5 is a flowchart illustrating a workflow for maintaining user workflow.
FIG. 6 is an example of a graphical user interface for a user search.

FIG. 5 is a preferred workflow diagram for maintaining user workflow. In order to access the user maintain user workflow, the user should be flagged as having permission to the maintain users menu item. On accessing this menu item the user accesses a search page to find the users. At step 46, a system user enters criteria into a search screen to locate a user to maintain. FIG. 6 is an example user interface 48 for a user search.

Preferably, criteria entered in more than one field are combined with a logical and. Wild cards are allowed. Names may be wild carded without the user knowing. External Counsel users may only find user details of that External Counsel's users. Customer Client users may only find details of that Customer Client's users.

The data of the original search should be preserved for the convenience of the user. If the user records are found at step 50, they should be displayed as a list below the search criteria and buttons, as illustrated generally by reference number 52, in FIG. 7.

Figure 8:
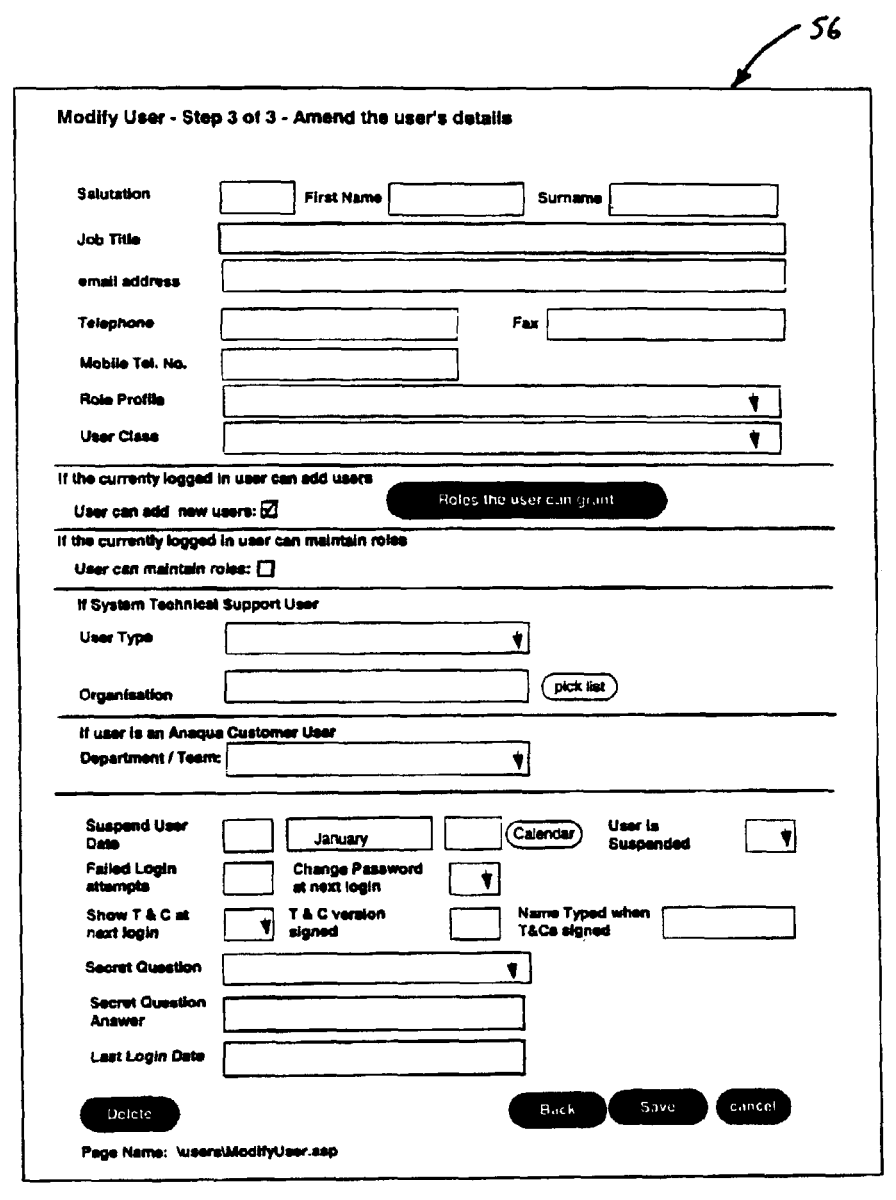

FIG. 8 is an example user interface 56 for amending user details. In one embodiment of the present invention, the system will first check whether the user has any chasers allocated to them. If they do, the system will not allow the deletion, returning the user to the modify users page with an error message. Next at step 54, the system will physically delete the user and all records from the login history table. The list of roles that is presented should be the list of roles that the currently logged in user is authorized to grant.

Table 7 defines example attributes for aspects of the user interface illustrated in FIG. 8.

TABLE 7

| Label | Table/Field | Mandatory | Type | Details and validation |
|---|---|---|---|---|
| All fields are from the User table unless otherwise specified ||||||
| Salutation | Salutation | Optional | Text | |
| First Name | FirstName | Mandatory | Text | |
| Surname | Surname | Mandatory | Text | |
| Job Title | JobTitle | Mandatory | Text | |
| E-Mail address | EmailAddress | Mandatory | Text | |
| Tel No | TelephoneNo | Mandatory | Text | |
| Fax No | FaxNo | Optional | Text | |
| Mobile Tel No | MobileNo | Optional | Text | |
| Role Profile | UserRoleID | Mandatory | Dropdown | Default is creating user's role profile Dropdown list from role profile table defaulting to creating user's role profile. If the user is an External Counsel User, they should only see roles flagged as available to External Counsel. |
| User Class | UserClassID | Mandatory | Dropdown | No default. Dropdown list from User Class table ((Mandatory) (Attorney, Inventor, Searcher, etc.)). This field is used to help searching. |
| Suspend User Date | SuspendUserDate | Mandatory | Date | |
| User Is Suspended | LockedOut | Mandatory | Dropdown | Yes/No |
| Failed Login Attempts | BadPWDAttempts | Optional | Read Only | |
| Change Password at next login | ChangePWDNextLogon | Mandatory | Dropdown | Yes/No |
| Show Ts & Cs at next login | NONE | Mandatory | Calculation | If T&CversionSigned < <current system terms and conditions>then Yes else No |
| T & C version signed | T&CversionSigned | Optional | | |
| Name Typed when T&Cs signed | T&CnameTyped | Optional | Read only | |
| Secret Question | SecretQuestionID | Mandatory | Dropdown | Dropdown from SecretQuestion table |
| Secret Question Answer | SecretQuestionAnswer | Optional | Text | |
| Last Login Date | LastLoginDate | Optional | Read Only | |
| If the modifying user has role System Technical Support, the following fields will be displayed: ||||||
| User Type | UserTypeID | Mandatory | Dropdown | Defaults to 'Customer User'. Pick list of 'Customer User', 'External Counsel User', 'Customer Client User' |
| Organization | OrganisationID | Mandatory | Picklist | No default If User Type = 'External Counsel', the creating user is required to enter the External Counsel Company from a pick list If User Type = 'Customer Client', the creating user is required to enter the Customer Client Company from a pick list. |

TABLE 7-continued

| Label | Table/Field | Mandatory | Type | Details and validation |
|---|---|---|---|---|
| If the user being created is a Customer User | | | | |
| Users Department/Team | DepartmentID | Optional | Dropdown | No default. Only for Customer Users. |
| If the modifying user can add new users | | | | |
| User can add new users | UserCanAddUsers | Mandatory | Checkbox | |
| If the modifying user can maintain roles | | | | |
| Users can maintain roles | UserCanMaintainRoles | Mandatory | Checkbox | |

At step 58, the 'Save' Button saves the changes and returns the user to Step 2. The 'Back' Button returns the user to step 2. The 'Cancel' Button cancels any changes and re-presents the user's record. If the user chooses to 'Delete' a user, a follow-up process may be followed.

Figure 9:
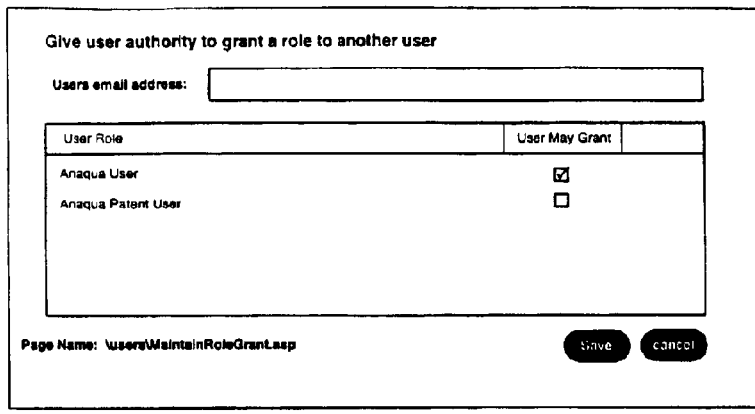
FIG. 9 is an example of a graphical user interface for granting roles to users.

FIG. 9 is an example user interface 60 for granting roles to another user. Table 8 defines example attributes for various aspects of the user interface illustrated in FIG. 9.

TABLE 8

| Label | Table/Field | Mandatory | Type | Details and validation |
|---|---|---|---|---|
| Users e-mail address | User.EmailAddress | Mandatory | Text | |
| All Fields from UserRoleMayGrant table unless specified | | | | |
| User Role User May Grant | UserRoleID | Mandatory Optional | Readonly Checkbox | Derived from the UserRoleMayGrant table. If a record exists for the User ID/Role ID combination, then User May Grant is true. If a record does not exist, then User May Grant is false. |

Figure 10:
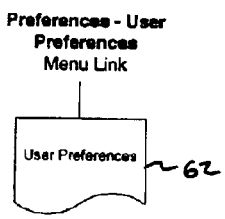
FIG. 10 is a flowchart illustrating a workflow for defining user preferences.
Figure 11:
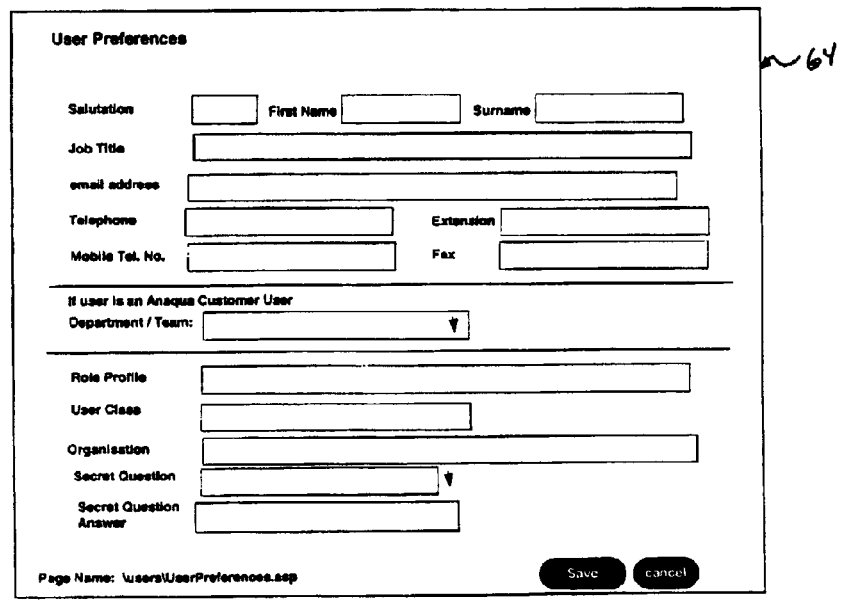
FIG. 11 is an example of a graphical user interface displaying user preferences.

FIG. 10 is a preferred workflow diagram for defining user preferences, illustrated as 62. User preferences may include business information, such as telephone number and email address, as well as a secret question and answer, which are used to retrieve secured information. FIG. 11 is an example user interface 64 for defining user preferences. Table 9 defines example attributes for aspects of the user interface illustrated in FIG. 11.

TABLE 9

| Label | Table/Field | Mandatory | Type | Details and validation |
|---|---|---|---|---|
| All fields are from the User table unless otherwise specified | | | | |
| Salutation | Salutation | Optional | Text | |
| First Name | FirstName | Mandatory | Text | |
| Surname | Surname | Mandatory | Text | |
| Job Title | JobTitle | Mandatory | Text | |
| Tel No | TelephoneNo | Mandatory | Text | |
| Fax No | FaxNo | Optional | Text | |
| Mobile Tel No | MobileNo | Optional | Text | |
| Role Profile | UserRoleID | Mandatory | Read only | |
| User Class | UserClassID | Mandatory | Dropdown | Dropdown list from User Class table ((Mandatory) (Attorney, Inventor, Searcher, etc.)). This field is used to help searching. |
| Secret Question | SecretQuestionID | Mandatory | Dropdown | Dropdown from SecretQuestion table |
| Secret Question Answer | SecretQuestionAnswer | Mandatory | Text | |
| Organization | OrganisationID | Mandatory | Read only | |
| If the user being created is an Anaqua Customer User | | | | |
| Users Department/Team | DepartmentID | Optional | Dropdown | No default. Only for Anaqua Customer Users |

In one embodiment of the present invention, the 'Save' Button saves the changes and returns the user their home page. The 'Cancel' Button cancels any changes and returns the user to their home page.

Figure 12:
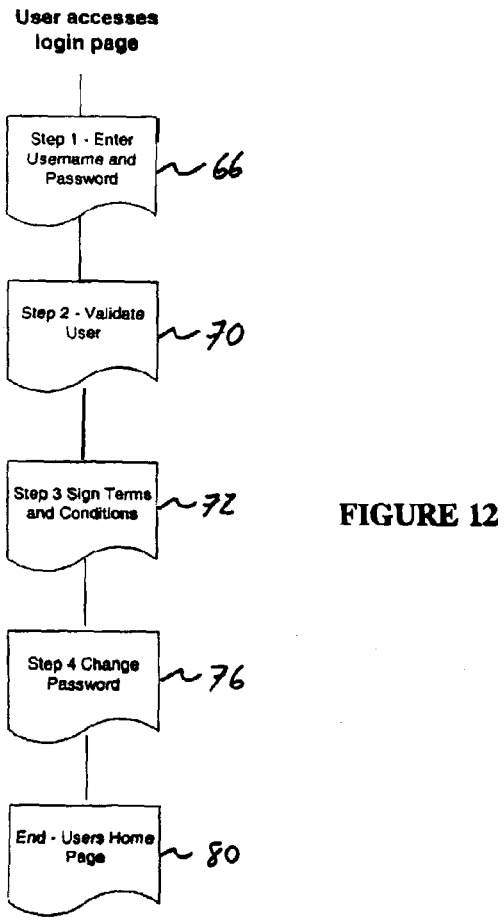
FIG. 12 is a flowchart illustrating a workflow for user login procedures.
Figure 13:
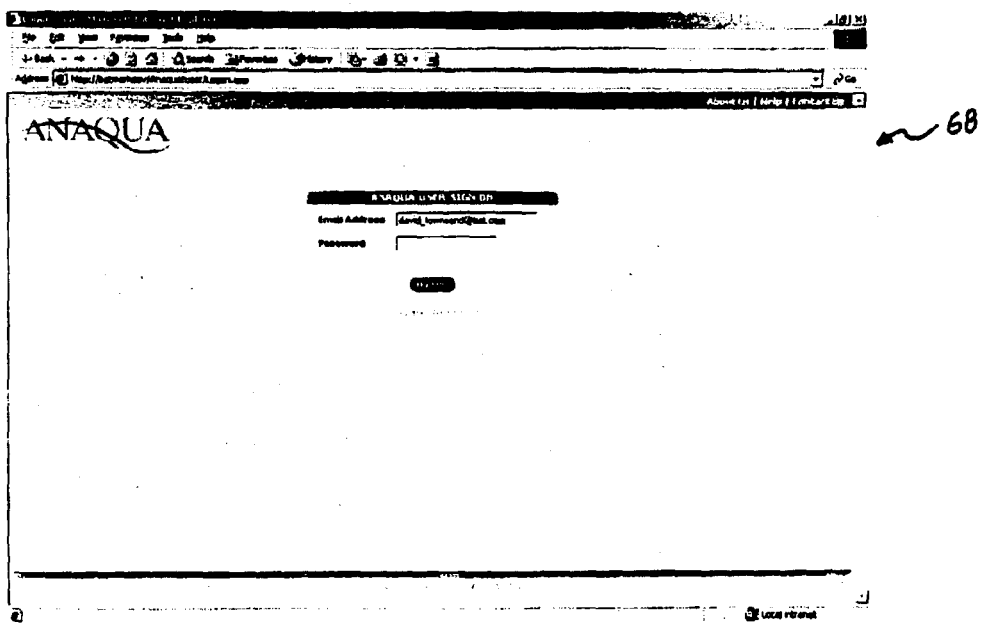
FIG. 13 is an example of a graphical user interface for user login.

FIG. 12 is a preferred workflow diagram for user login. The user login workflow comprises five primary steps. At step 66, the user enters a user identification and password into fields on the screen 68. FIG. 13 is an example user interface for Step 1 of user login. In one preferred aspect of the invention, the user identification is the user's email address. Table 10 defines example attributes for aspects of the user interface illustrated in FIG. 13.

TABLE 10

| Label | Table/Field | Mandatory | Type | Details and validation |
|---|---|---|---|---|
| All fields are from the User table unless otherwise specified ||||||
| E-mail Address | EmailAddress | Mandatory | Text | |
| Password | Password | Mandatory | Text | Text entered should be displayed as *s |

The 'Sign On' Button proceeds the user to step 2. The 'Forgotten Password' Link redirects to a Forgotten Password Page.

At number 70, the second step of the user login workflow is user validation. The identification and password are checked against stored user information in the workflow tool. If the user identification (ID) exists and the password is incorrect, the following actions will be taken.

Action 1—Increment the user's <failed login attempts> counter by 1

Action 2—Error Page—The user is re-directed back to the login page with an error message at the top of the pages.

If the user's new <failed login attempts> counter is greater than the <system login attempts allowed> system parameter, the user is redirected to a page with the following text:

You have failed to correctly provide your user ID and password several times, so your account has been suspended. Please go to the forgotten password page to re-set your password.

The page may have two buttons;

Cancel—which returns the user to the www.domain.com site.

Forgotten Password—takes the user to the Forgotten Password page.

If the user ID is incorrect, the user is re-directed back to the login page with an error message at the top of the page.

If the User ID and Password are validated, and the user's IP address does not belong to the 'blocked IP address' table, then the user's <failed login attempts> counter shall be set to 0, and the user may progress to step 3.

At step 72, the user login workflow checks the terms and conditions of the user's account. If the user's account has its <terms and conditions signed> greater than or equal to the <current system terms and conditions>, the user may progress to step 4, referenced by numeral 76. If the user's account has its <terms and conditions signed> less than the <current system terms and conditions>, the user may be redirected or may progress to step 4.

Figures 14, 15:
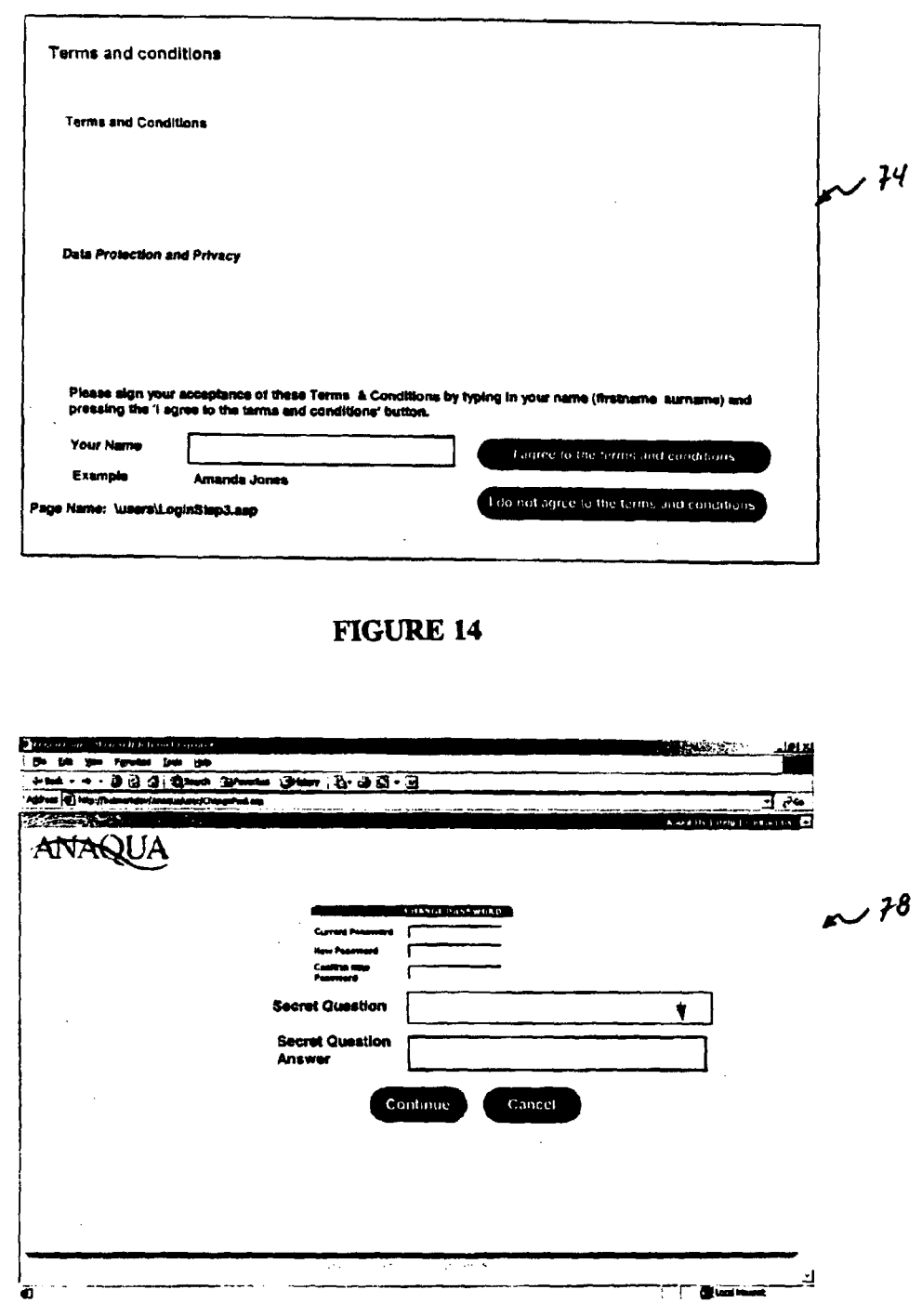

Preferably, a page is displayed requiring the user to read the terms and conditions, and give notice of their acceptance. FIG. 14 illustrates an example user interface 74 for displaying terms and conditions for a particular user account. According to one embodiment of the invention, upon selecting the "I agree" button, the system will do the following validations:

Validation 1—If the name typed does not match the first name and surname of the account, the system will re-display the terms and conditions page with an error message.

Validation 2—If the name typed matches the first name and surname of the account, the system will store the name typed in the <name typed at last terms and conditions acceptance> attribute of the user accounts, set to <terms and conditions signed> equal to the <current system terms and conditions> for the user account, and allow the user to progress to Step 4.

The fourth step of the user login workflow is change password, illustrated as step 76. If the user's <change password on next login> is set to No, the user will proceed to Step 5, which is the user's system home page 80.

If the user's <change password on next login> is set to Yes, the system will prevent the example user interface illustrated as numeral 80 in FIG. 15. Table 11 defines example attributes for aspects of the user interface illustrated in FIG. 15.

TABLE 11

| Label | Table/Field | Mandatory | Type | Details and validation |
|---|---|---|---|---|
| All fields are from the User table unless otherwise specified ||||||
| Current Password | Password | Mandatory | Text | Text entered should be displayed as *s |
| New Password | None | Mandatory | Text | Text entered should be displayed as *s Passwords stored in the database should be encrypted so that no-one can view the password. |
| Confirm New Password | None | Mandatory | Text | Text entered should be displayed as *s Passwords stored in the database should be encrypted so that no-one can view the password. |
| Secret Question | SecretQuestionID | Mandatory | Dropdown | Dropdown from SecretQuestion table |
| Secret Question Answer | SecretQuestionAnswer | Mandatory | Text | |

If the user presses the Change Password button, the system will check if the length of the New Password less than <system min password length> or the password does not contain at least one Alpha character (a-z,A-Z) and one number character (0-9), the system will re-display the page with an error message. If the Current Password does not match the password on the user's account, or the New Password does not match the re-entered password, the system will re-display the change password page with an error message, and increment the users <failed login attempts> by 1.

If the user's new <failed login attempts> counter is greater than the <system login attempts allowed> system parameter, an error page is displayed. If the Current Password matches the password on the account and the New Password and Re-entered password are the same (but different from the current password), and the new password length is greater than the <system min password length> and the new password contains at least one letter and number, the system will set the user's <change password on next login> to No and the user will progress to Step 5.

The fifth step of the user login workflow is a successful login, referenced generally as numeral 80. In this step, the system will record the user ID, date and time in the successful login table, record the new password in an encrypted format in the user table, and redirect the user to their system home page.

Figures 16, 17:
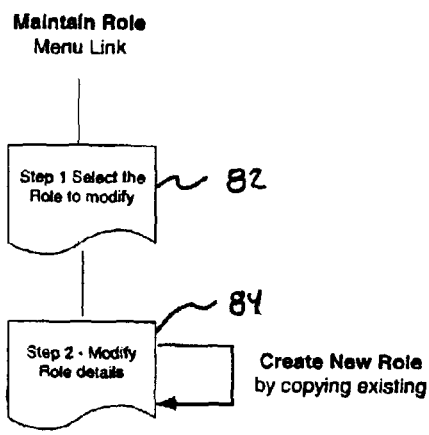
FIG. 16 is a flowchart illustrating a workflow for role maintenance.
FIG. 17 is an example of a graphical user interface for selecting a user role to maintain.
Figure 18:
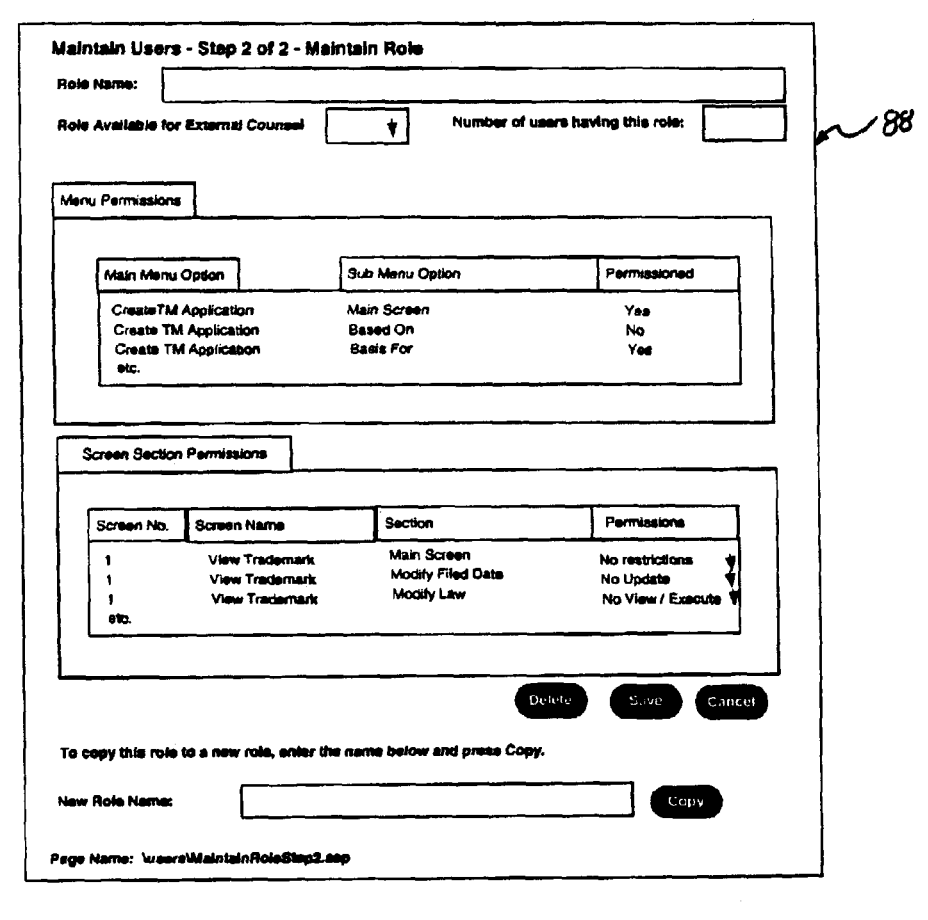

FIG. 16 is a preferred workflow for role maintenance. This workflow comprises two primary steps: Selection of a role to maintain, referenced as numeral 82, and maintaining the selected user role, referenced as numeral 84. FIG. 17 is an example user interface 86 for selecting a role to maintain. FIG. 18 is an example user interface 88 for maintaining user roles. Table 12 defines example attributes for aspects of the user interface illustrated in FIGS. 17 and/or 18.

The 'Save' Button saves the changes to the role profile and returns the user to step 1. The 'Cancel' Button cancels all changes and returns the user to step 1. The 'Delete' Button only appears if the number of users for this role' dialogue. If they confirm they are sure, the role is deleted.

The 'Copy' Button will check that a role name has been entered and that it is unique. If both of these conditions are satisfied, a new role is created copying all of the permissions of the original role. There is no link between the new and original roles, unless the user observes some kind of naming convention e.g.

Customer User—Trademarks
    Customer User—Trademarks—Paralegal
    Customer User—Trademarks—Attorney On completion of the create process, the user is returned to the Step 2 Maintain Role screen with the new role being the focus.

Tables 13 and 14 contain example menu level permissions and roles.

TABLE 13

| Role Details | Accessible to External Counsel |
|---|---|
| Role 1 - System Technical Support | No |
| Role 2 - Super User | No |
| Role 3 - Customer User - All | No |
| Role 4 - Customer User - Trademarks | No |
| Role 5 - Customer User - Patents | No |
| Role 6 - Customer User - Conflicts | No |
| Role 7 - Customer User - Agreements | No |
| Role 8 - Not used | No |
| Role 9 - External Counsel - All | Yes |
| Role 10 - External Counsel - Trademarks | Yes |
| Role 11 - External Counsel - Patents | Yes |
| Role 12 - Not used | No |
| Role 13 - Not used | No |
| Role 14 - Customer Client | No |

TABLE 12

| Label | Table/Field | Mandatory | Type | Details and validation |
|---|---|---|---|---|
| All fields are from the UserRoles table unless otherwise specified ||||| 
| Role Name | UserRoleName | Mandatory | Text | Role names must be unique |
| Role Available for external counsel | AvailableToExternalCounsel | Mandatory | Dropdown | Yes/No |
| Number of users having this role | None | Mandatory | Read only | The count of the number of users having this role |
| Menu Permissions Tab ||||| 
| All fields are from the RoleMenuPermissions table unless otherwise specified ||||| 
| Main Menu Option | MenuName | Mandatory | Read only | |
| Sub Menu Option | SubMenuName | Mandatory | Read only | |
| Permissioned | Permissioned | Mandatory | Option | Yes/No |
| Screen Section Permissions Tab ||||| 
| All fields are from the RoleScreenSectionPermissions table unless otherwise specified ||||| 
| Screen Number | ScreenID | Mandatory | Read only | |
| Screen Name | RoleScreenPermissions.ScreenName | Mandatory | Read only | |
| Screen Section | SectionName | Mandatory | Read only | |
| Permissions | PermissionID | Mandatory | Dropdown | A dropdown of the following No restrictions No Update No View/Execute |
| New Role Name | UserRoles.UserRoleName | Mandatory | Text | Role names must be unique |

TABLE 14

| Main Menu Item | Sub Menu Item | Role 1 | Role 2 | Role 3 | Role 4 | Role 5 | Role 6 | Role 7 | Role 8 | Role 9 | Role 10 | Role 11 | Role 12 | Role 13 | Role 14 |
|---|---|---|---|---|---|---|---|---|---|---|---|---|---|---|---|
| Find | TM Application | ☑ | ☑ | ☑ | ☑ |  |  |  |  | ☑ | ☑ |  |  |  | ☑ |
|  | Patent (phase 3) | ☑ | ☑ | ☑ |  | ☑ | ☑ | ☑ |  | ☑ |  | ☑ |  |  | ☑ |
|  | Search | ☑ | ☑ | ☑ | ☑ |  |  |  |  | ☑ | ☑ |  |  |  | ☑ |
|  | Domain Name | ☑ | ☑ | ☑ |  |  |  |  |  |  |  |  |  |  | ☑ |
|  | Copyright | ☑ | ☑ | ☑ |  |  |  |  |  |  |  |  |  |  | ☑ |
|  | Conflict | ☑ | ☑ | ☑ |  |  | ☑ | ☑ |  |  |  |  |  |  | ☑ |
|  | Agreement | ☑ | ☑ | ☑ |  |  | ☑ | ☑ |  |  |  |  |  |  | ☑ |
|  | Invoice | ☑ | ☑ | ☑ |  |  |  |  |  |  |  |  |  |  | ☑ |
| Create | TM Application | ☑ | ☑ | ☑ | ☑ |  |  |  |  |  |  |  |  |  |  |
|  | Patent (Phase 3) | ☑ | ☑ | ☑ |  | ☑ | ☑ |  |  |  |  |  |  |  |  |
|  | Search | ☑ | ☑ | ☑ | ☑ |  |  |  |  |  |  |  |  |  |  |
|  | Domain Name | ☑ | ☑ | ☑ |  |  |  |  |  |  |  |  |  |  |  |
|  | Copyright | ☑ | ☑ | ☑ |  |  |  |  |  |  |  |  |  |  |  |
|  | Conflict | ☑ | ☑ | ☑ |  |  | ☑ | ☑ |  |  |  |  |  |  |  |
|  | Agreement | ☑ | ☑ | ☑ |  |  | ☑ | ☑ |  |  |  |  |  |  |  |
|  | Invoice | ☑ | ☑ | ☑ |  |  |  |  |  |  |  |  |  |  |  |
| Maintain | Brand | ☑ | ☑ | ☑ | ☑ |  |  |  |  |  |  |  |  |  |  |
|  | Mark | ☑ | ☑ | ☑ | ☑ |  |  |  |  |  |  |  |  |  |  |
|  | Invention (Phase 3) | ☑ | ☑ | ☑ |  | ☑ | ☑ | ☑ |  |  |  |  |  |  |  |
|  | Agent | ☑ | ☑ | ☑ |  |  |  |  |  |  |  |  |  |  |  |
|  | Company | ☑ | ☑ | ☑ |  |  |  |  |  |  |  |  |  |  |  |
|  | Territory | ☑ | ☑ | ☑ |  |  |  |  |  |  |  |  |  |  |  |
|  | Users | ☑ | ☑ |  |  |  |  |  |  | ☑ |  |  |  |  | ☑ |
|  | User Roles | ☑ | ☑ |  |  |  |  |  |  |  |  |  |  |  |  |
| Preferences | User Preferences | ☑ | ☑ | ☑ | ☑ | ☑ | ☑ | ☑ |  | ☑ | ☑ | ☑ |  |  | ☑ |
|  | Edit Favourites | ☑ | ☑ | ☑ | ☑ | ☑ | ☑ | ☑ |  | ☑ | ☑ | ☑ |  |  | ☑ |
|  | Change Password | ☑ | ☑ | ☑ | ☑ | ☑ | ☑ | ☑ |  | ☑ | ☑ | ☑ |  |  | ☑ |
|  | Add New User | ☑ | ☑ |  |  |  |  |  |  | ☑ |  |  |  |  |  |
|  | Add New Use Role | ☑ | ☑ |  |  |  |  |  |  |  |  |  |  |  |  |

Figure 19:
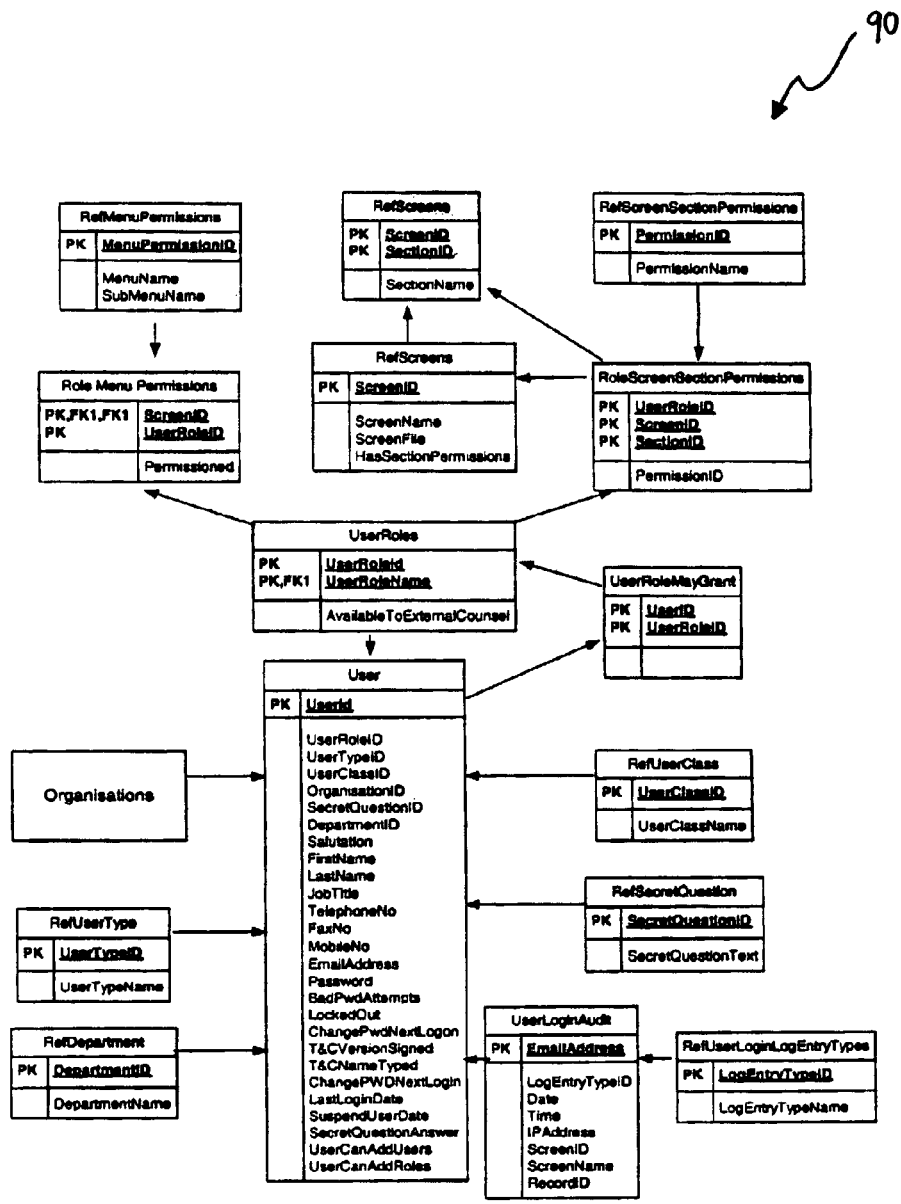
FIG. 19 is a block diagram illustrating a preferred entity relationship diagram setting forth user roles and access rights.

FIG. 19 is a block diagram 90 illustrating a preferred entity relationship diagram setting forth user roles and access rights. The distributed legal workflow security computer system allows users, through one or more computers, to input system access privileges for one or more legal workflow participants based on one or more legal workflow role types. System users may associate permission privileges for a plurality of legal workflow graphical interface systems functions based on the legal workflow role types. Each system user or participant is allowed access to legal workflow graphical interface functionality according to the permission privileges associated with the participants respective legal workflow role types.

Third Party Interface Workflow

In one aspect of the present invention, a process is defined in which third parties update information on the collaborative legal workflow tool. Third parties are presented with the same collaborative legal workflow product. One difference may be that the permissioning on the screens will vary, as defined by business requirements. There are different types of permissioning that may be applied. For example, certain screens may not be available to certain third parties and/or third party users, and certain fields may be set to 'Read Only' or 'No Execute'.

Third party subject areas and functionality in accordance with the present invention include, but is not limited to, trademark applications, trademark searches, conflicts, organizations, time recording, billing, invoicing, agreements, copyrights, domain names, patents, maintenance screen (e.g., brands and marks, territories, organizations, etc.), reporting and the implementation of tasks for third party diaries.

Third party law firms may see records where they have been instructed as an agent. This rule may apply where law firms are browsing through related records; i.e., they may only see related records where they are representing the Customer.

When a trademark is registered, the Registry Office may insist that a trademark is associated with other registered trademarks. This typically means that the same company may own the associated trademarks. However, certain territories do not necessarily associate registrations. Therefore, if a law firm operates in a territory where associations do not apply, then the "associations" drop window option should be set to 'No Execute'. Law firms may be able to use a diary to raise ad hoc tasks for Customers. In addition to this, law firms may record event history. Law Firms may also receive tasks through the diary.

When a third party wishes to click through an underlying record, they should be able to click through to conflicts (read only) and trademark records where they are representing the customer, and all organizational records (read only). Third parties may not be able to click through invoices, agreements, copyrights, domain names and maintenance functions. Preferably, the screen design clearly shows the user what areas are read only. For the third party interfaces, "create" and "admin" functionality should be disabled.

Figure 20:
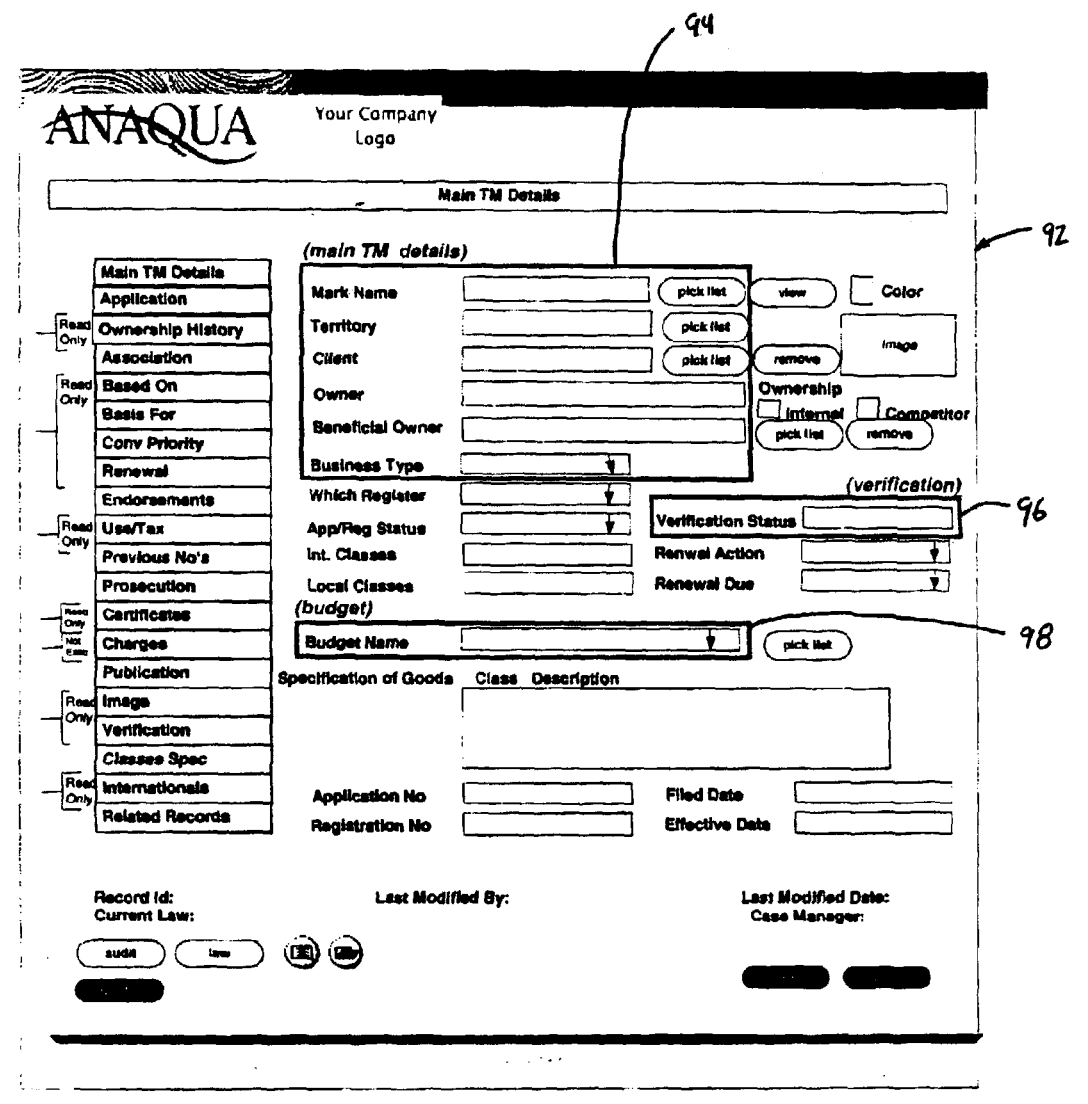

FIG. 20 is an example user interface 92 for maintenance of legal workflow in the collaborative online workflow tool of the present invention. For demonstrative purposes, a "Maintain TM Details" page is illustrated. In one embodiment of the present invention, the following permissible sections, "Main TM Details" 94, "Verification" 96 and "Budget Name" 98, are accessible by the users to allow modification of the information stored in those fields. The remainder of the fields are permissioned to "Read Only" access.

It is understood that if the security privileges for these fields are set to "Read Only," a user would be unable to modify any information. Additionally, the "charges" child window option should be set to 'No Execute'. The save, delete, edit and law buttons for the following child windows should be set to 'No Execute': based on, basis for, conv.priority, renewal, use/tax, certificates, image, verification and internationals. It is also understood that the user interface can be modified to manage a variety of intellectual property matters, including patents, financial invoicing, trademarks, conflicts and agreements.

Figure 21:
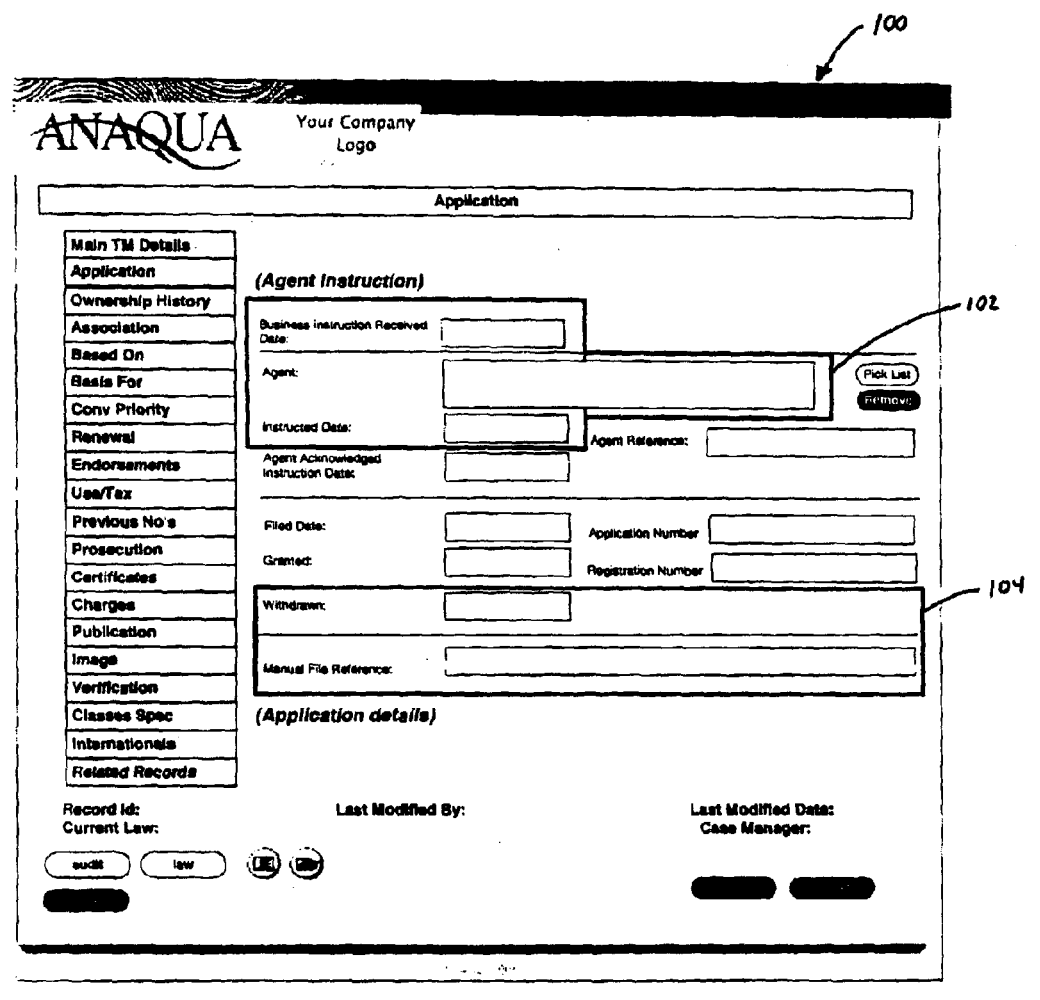

FIG. 21 illustrates an example user interface 100 for a child window of the trademark workflow record. The child window includes permissioned fields which allow modification of trademark information based on security permissions. In one embodiment of the present invention, the agent instructions 102 and application details 104 sections are set to allow modification of information by the user.

Figure 22:
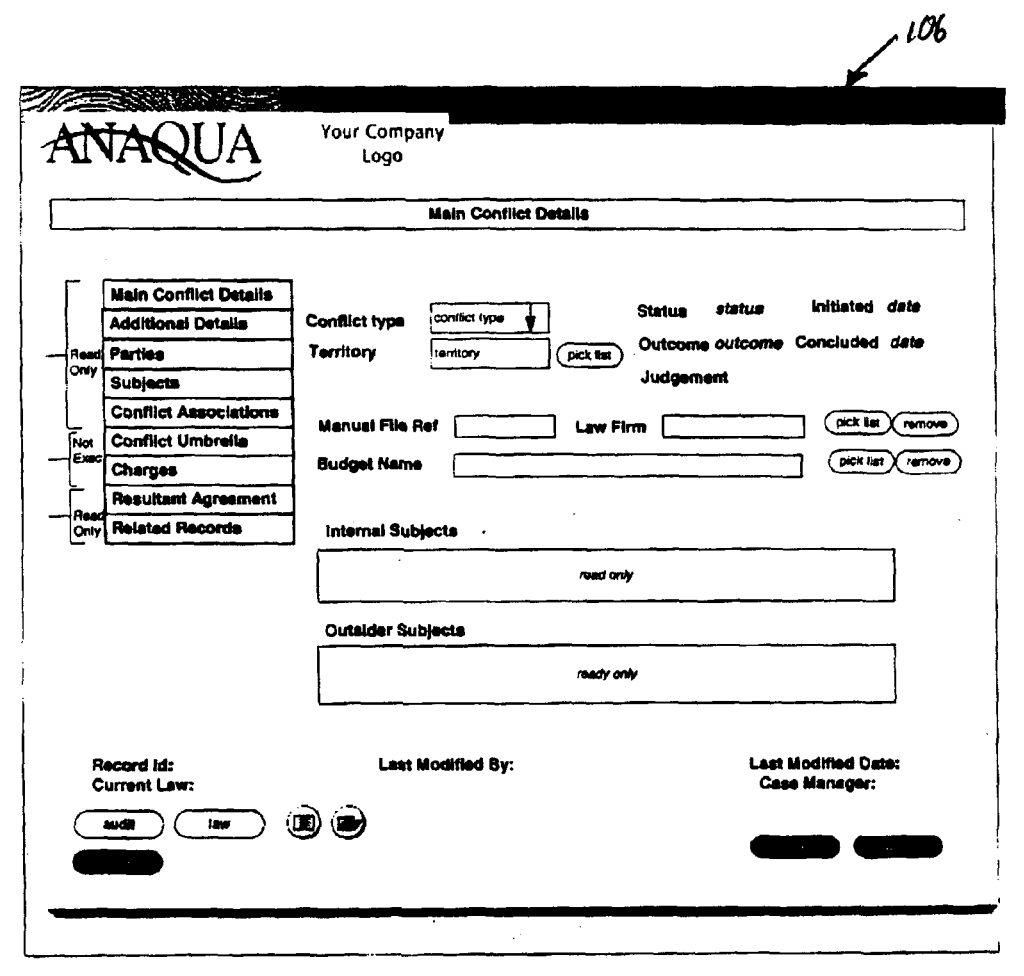

FIG. 22 illustrates an example user interface 106 for defining and presenting main conflict details. Preferably the conflict umbrella and charges child window menu options are set to 'No Execute'. On all of the windows, the save, delete, edit and law buttons should be set to 'No Execute'.

Figure 23:
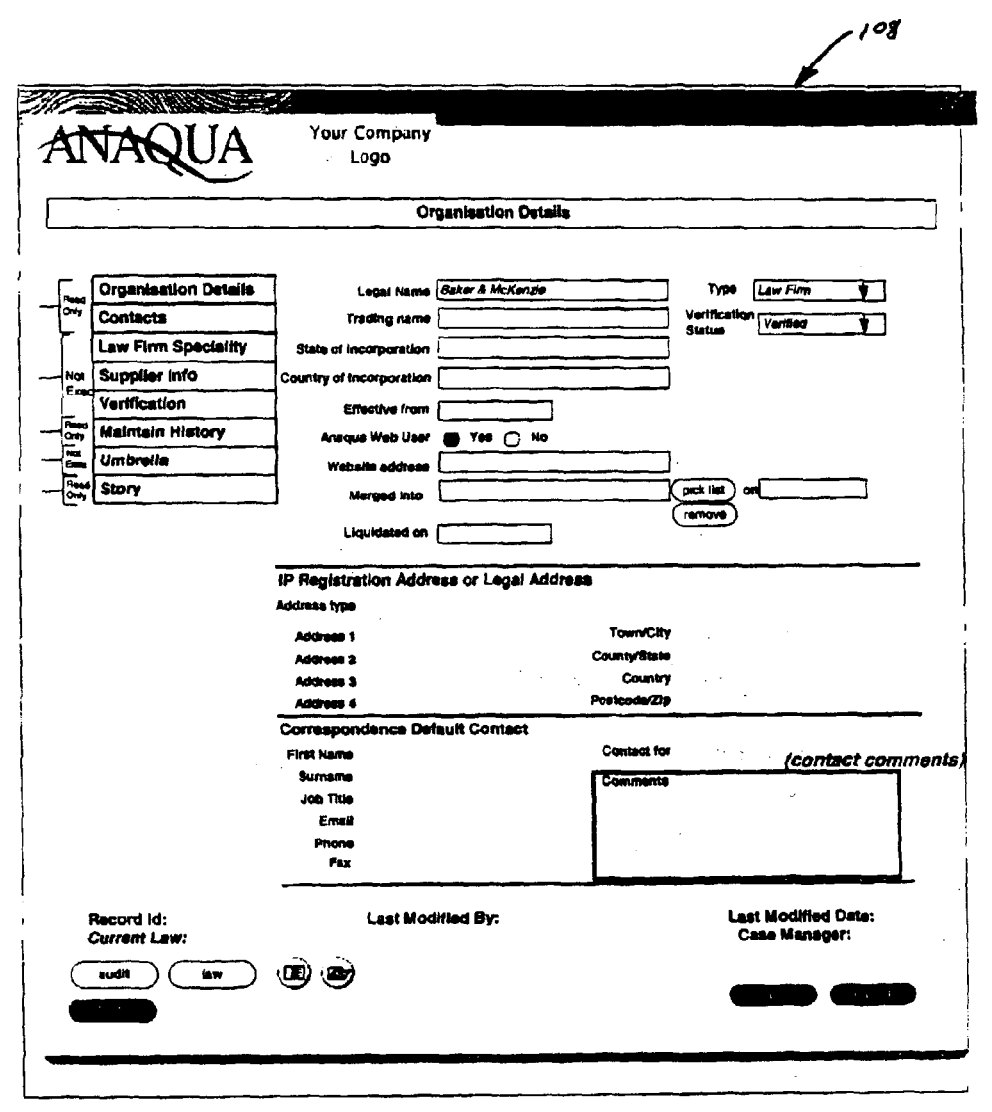

FIG. 23 illustrates a user interface 108 for defining organizational details. Preferably, the contact comments section is set to 'No View'. The following child window menu option should also be set to 'No Execute': Law firm specialty, supplier info., verification and umbrella.

Figure 24:
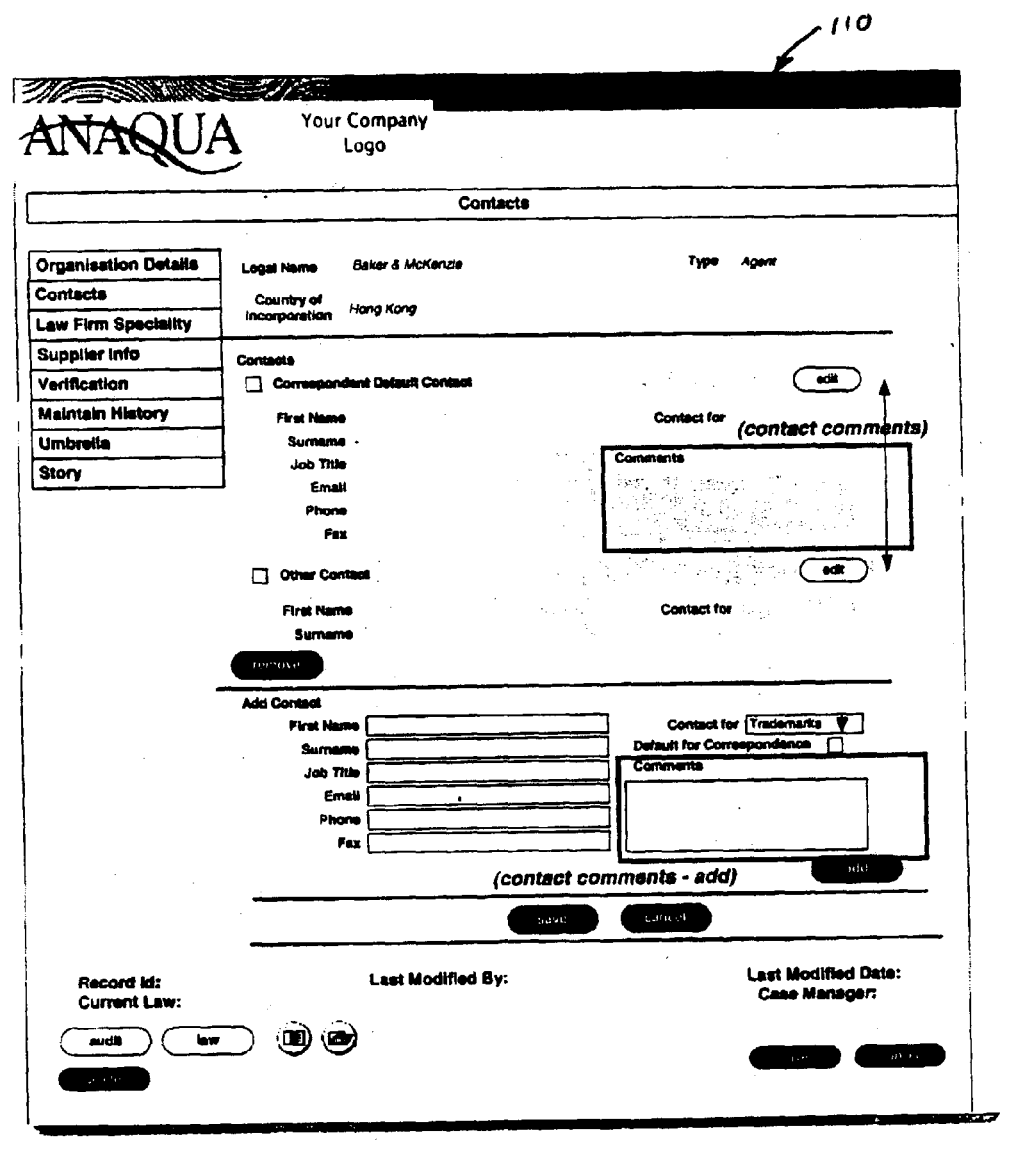

FIG. 24 illustrates an example user interface 110 for defining contact information. Preferably, the contact comments and contact comments-add sections are set to 'No View'.

While the best mode for carrying out the invention has been described in detail, those familiar with the art to which this invention relates will recognize various alternative designs and embodiments for practicing the invention as defined by the following claims.

What is claimed is:

1. A computer system for distributed legal workflow security, the computer system providing central administration of legal workflow conducted by a plurality of distributed workflow participants, the system comprising a computer network including one or more computers operably programmed and configured to:
   permit an administrator to (i) create user accounts for each of the participants, (ii) associate one or more legal workflow role types with each of the accounts, and (iii) associate menu item permission privileges for a plurality of common menu items of a common legal workflow graphical interface with each of the types;
   provide the common interface to each of the participants, wherein the menu items are displayed to each of the participants via the common interface independent of the permission privileges associated with the type of the participant's account such that only the menu items for which the type of the participant's account has permission are active; and
   permit one of the participants to create another account of a same type as the one of the participant's account and with same or fewer permission privileges as the type of the one of the participant's account.

2. The system of claim 1 wherein the legal workflow includes intellectual property legal workflow.

3. The system of claim 2 wherein the intellectual property legal workflow includes patent legal workflow.

4. The system of claim 2 wherein the intellectual property legal workflow includes trademark legal workflow.

5. The system of claim 2 wherein the intellectual property legal workflow includes conflict legal workflow.

6. The system of claim 2 wherein the intellectual property legal workflow includes agreement legal workflow.

7. The system of claim 2 wherein the intellectual property legal workflow includes legal financial workflow.

8. The computer system of claim 1 wherein the permission privileges include active, inactive, hidden, greyed, edit, no edit, add, delete or grant.

9. The computer system of claim 1 wherein the menu items include text, graphics, hyperlinks, form fields, buttons, drop-down lists, tables, menu items or page sections.

10. The computer system of claim 1 wherein the one or more computers are additionally programmed and configured to filter data records according to legal workflow role type.

11. The computer system of claim 1 wherein the one or more computers are additionally programmed and configured to filter data records according to distributed legal-workflow participant.

12. The computer system of claim 1 wherein the permission privileges are associated based on a geographical location of the distributed workflow participants.

13. A method for providing legal workflow security conducted by a plurality of distributed workflow participants, the method comprising:
   permitting an administrator to (i) create user accounts for each of the participants, (ii) receiving associate one or more legal workflow role types with each of the accounts, and (iii) associate menu item permission privileges for a plurality of common menu items of a common legal workflow graphical interface with each of the types;
   providing the common interface to each of the participants, wherein the menu items are displayed to each of the participants via the common interface independent of the permission privileges associated with the type of the participant's account such that only the menu items for which the type of the participant's account has permission are active; and
   permitting one of the participants to create another account of a same type as the one of the participant's account and with same or fewer permission privileges as the type of the one of the participant's account.

14. The method of claim 13 further comprising providing a computer network including one or more computers operably programmed and configured to input user access commands.

15. The method of claim 14 further comprising filtering data records with the one or more computers according to legal workflow role type.

16. The method of claim 14 further comprising filtering data records with the one or more computers according to distributed workflow participant.

17. The method of claim 14 further comprising filtering data records with the one or more computers based on a geographical location of the distributed workflow participants.

18. The method of claim 13 wherein the permission privileges include active, inactive, hidden, greyed, edit, no edit, add, delete or grant.

19. The method of claim 13 wherein providing the common interface to each of the participants further comprises generating features including text, graphics, hyperlinks, form fields, buttons, drop-down lists, tables, menu items or page sections.

* * * * *

UNITED STATES PATENT AND TRADEMARK OFFICE
CERTIFICATE OF CORRECTION

PATENT NO.         : 8,429,723 B2
APPLICATION NO.    : 13/166040
DATED              : April 23, 2013
INVENTOR(S)        : Damian O. Porcari et al.

Page 1 of 1

It is certified that error appears in the above-identified patent and that said Letters Patent is hereby corrected as shown below:

In the Claims

Column 22, Line 14, Claim 11:

After "according to distributed" delete "legal".

Column 22, Line 23, Claim 13:

After "each of the participants" delete "receiving".

Signed and Sealed this
Third Day of December, 2013

Margaret A. Focarino
*Commissioner for Patents of the United States Patent and Trademark Office*